United States Patent
Longobardi et al.

(10) Patent No.: US 12,339,370 B2
(45) Date of Patent: Jun. 24, 2025

(54) METHOD AND SYSTEM FOR DETECTING OBSTACLES IN AN ENVIRONMENT OF A USER IN REAL-TIME

(71) Applicant: HCL Technologies Italy S.p.A., Rome (IT)

(72) Inventors: Giuseppe Longobardi, Rome (IT); Maria Elena Massino, Rome (IT); Francesca Solida, Rome (IT)

(73) Assignee: HCL Technologies Italy S.p.A., Rome (IT)

(*) Notice: Subject to any disclaimer, the term of this patent is extended or adjusted under 35 U.S.C. 154(b) by 909 days.

(21) Appl. No.: 17/514,563

(22) Filed: Oct. 29, 2021

(65) Prior Publication Data
US 2023/0133095 A1 May 4, 2023

(51) Int. Cl.
*G01S 17/93* (2020.01)
*G01S 7/48* (2006.01)
(Continued)

(52) U.S. Cl.
CPC ............ *G01S 17/93* (2013.01); *G01S 7/4808* (2013.01); *G01S 7/4811* (2013.01); *G08B 7/06* (2013.01)

(58) Field of Classification Search
CPC ...... G01S 17/93; G01S 7/4808; G01S 7/4811; G01S 7/4802; G01S 17/88; G01S 17/42;
(Continued)

(56) References Cited

U.S. PATENT DOCUMENTS 9,508,269 B2 * 11/2016 Slamka ................. G01C 21/20
9,770,382 B1 * 9/2017 Ellis ......................... G01S 13/93
(Continued)

FOREIGN PATENT DOCUMENTS

CN 102631280 A 8/2012
IN 201811038024 A 4/2020

OTHER PUBLICATIONS

Dimitrios Dakopoulos et al., Wearable Obstacle Avoidance Electronic Travel Aids for Blind: A Survey, Jan. 2010, pp. 25-35, vol. 40, No. 1, IEEE Transactions On Systems, Man, and Cybernetics—Part C: Applications and Reviews.
(Continued)

*Primary Examiner* — An T Nguyen
(74) *Attorney, Agent, or Firm* — Kendal M. Sheets

(57) ABSTRACT

This disclosure relates to method and system for detecting obstacles in an environment of a user in real-time. The method includes generating a LASER beam towards each of a plurality of regions in the environment of the user; receiving a feedback signal based on reflection of the LASER beam from an obstacle located in at least one of the plurality of regions; transforming the feedback signal from the at least one of the plurality of regions into obstacle information through a Machine Learning (ML) algorithm; activating one or more of a plurality of pressure elements of an obstacle matrix based on the obstacle information of the at least one of the plurality of regions; and generating a predefined pressure through each of the one or more of the plurality of pressure elements of the obstacle matrix based on obstacle information of the at least one of the plurality of regions.

20 Claims, 7 Drawing Sheets

(51) Int. Cl.
*G01S 7/481* (2006.01)
*G08B 7/06* (2006.01)

(58) Field of Classification Search
CPC ....... G01S 17/89; G08B 7/06; G08B 21/0446; G08B 21/0415
See application file for complete search history.

(56) References Cited

U.S. PATENT DOCUMENTS

| | | | |
|---|---|---|---|
| 9,851,434 B2 | 12/2017 | Caporizzo | |
| 10,024,667 B2* | 7/2018 | Moore | G01C 21/20 |
| 10,134,304 B1* | 11/2018 | Beals | G01S 7/4802 |
| 12,154,451 B1* | 11/2024 | Brathwaite | G06F 3/016 |
| 2006/0028544 A1* | 2/2006 | Tseng | A61H 3/068 348/62 |
| 2013/0220392 A1* | 8/2013 | Gassert | A61H 3/068 135/66 |
| 2014/0184384 A1 | 7/2014 | Zhu et al. | |
| 2018/0356233 A1* | 12/2018 | Baqain | H04M 1/72412 |
| 2020/0367618 A1* | 11/2020 | Daly | A45B 3/04 |

OTHER PUBLICATIONS

Ali Jasim Ramadhan, Wearable Smart System for Visually Impaired People, Mar. 13, 2018, pp. 1-13, 18, 843, Sensors 2018.

Wojciech Gelmuda et al., Vibrating Bracelet Interface for Blind People, 2012, pp. 199-206, Issue 260, Proceedings of Electrotechnical Institute.

Mounir Bousbia Salah et al., A Navigation Tool for Blind People, Apr. 2007, pp. 333-337, Innovations and Advanced Techniques in Computer and Information Sciences and Engineering.

Rachel Metz, A Smart Watch to Help Blind People Navigate, Aug. 4, 2017, MIT Technology Review.

* cited by examiner

METHOD AND SYSTEM FOR DETECTING OBSTACLES IN AN ENVIRONMENT OF A USER IN REAL-TIME

TECHNICAL FIELD

This disclosure relates generally to visual assistance, and more particularly to method and system for detecting obstacles in an environment of a user in real-time.

BACKGROUND

Mobility is still one of the biggest problems faced by blind and visually impaired people every day. Conventional methods to aid in mobility of visually impaired people is use of guide dogs, sticks, human companions. However, such methods require at least one hand of the visually impaired person to be occupied. Maintenance costs for guide dogs and remuneration of human assistants is also a major factor which deprives most of the visually impaired people from regular movement.

Machine Learning (ML) algorithms have grown increasingly reliable over the past few years. However, ML algorithms based on image recognition require highly efficient computational resources. In situations when a dangerous obstacle (such as a deep hole, stairs, or a wall) is lying ahead, response required should be prompt and immediate so as to avoid any fatal accident.

The conventional techniques fail to provide for methods to accurately and efficiently detect obstacles in real-time for a blind or a visually impaired person. There is, therefore, a need in the present state of art for techniques to detect obstacles of different heights and depths in real-time.

SUMMARY

In one embodiment, a method for detecting obstacles in an environment of a user in real-time is disclosed. In one example, the method includes generating, by a wearable Light Amplification by Stimulated Emission of Radiation (LASER) scanner, a LASER beam towards each of a plurality of regions in the environment of the user. The environment includes an arc with respect to a current position of the user. The arc includes a predefined radial distance, a predefined angle, and one of a predefined height or a predefined depth. The arc is divided into the plurality of regions based on a corresponding angle and one of a corresponding height or a corresponding depth with respect to the current position of the user. The method further includes receiving, by the wearable LASER scanner, a feedback signal based on reflection of the LASER beam from an obstacle located in at least one of the plurality of regions. The method further includes transforming, by the wearable LASER scanner, the feedback signal from the at least one of the plurality of regions into obstacle information through a Machine Learning (ML) algorithm. The obstacle information includes an angle and one of a height or a depth of the obstacle with respect to the current position of the user. The method further includes activating, by a wearable device, one or more of a plurality of pressure elements of an obstacle matrix based on the obstacle information of the at least one of the plurality of regions. The plurality of pressure elements is arranged in rows and columns in the obstacle matrix. Each of the plurality of pressure elements corresponds to each of the plurality of regions. The method further includes generating, by the wearable device, a predefined pressure through each of the one or more of the plurality of pressure elements of the obstacle matrix based on the obstacle information of the at least one of the plurality of regions. The one or more of the plurality of pressure elements correspond to the at least one of the plurality of regions. The predefined pressure may be directly sensed by the user through skin of the user in a region of application of the predefined pressure.

In one embodiment, a system for detecting obstacles in an environment of a user in real-time is disclosed. In one example, the system includes a wearable LASER scanner configured to generate a LASER beam towards each of a plurality of regions in the environment of the user. The environment includes an arc with respect to a current position of the user. The arc includes a predefined radial distance, a predefined angle, and one of a predefined height or a predefined depth. The arc is divided into the plurality of regions based on a corresponding angle and one of a corresponding height or a corresponding depth with respect to the current position of the user. The wearable LASER scanner is further configured to receive a feedback signal based on reflection of the LASER beam from an obstacle located in at least one of the plurality of regions. The wearable LASER scanner is further configured to transform the feedback signal from the at least one of the plurality of regions into obstacle information through an ML algorithm. The obstacle information includes an angle and one of a height or a depth of the obstacle with respect to the current position of the user. The system further includes a wearable device including an obstacle matrix and configured to activate one or more of a plurality of pressure elements of the obstacle matrix based on the obstacle information of the at least one of the plurality of regions. The plurality of pressure elements is arranged in rows and columns in the obstacle matrix. Each of the plurality of pressure elements corresponds to each of the plurality of regions. The wearable device is further configured to generate a predefined pressure through each of the one or more of the plurality of pressure elements of the obstacle matrix based on the obstacle information of the at least one of the plurality of regions. The one or more of the plurality of pressure elements correspond to the at least one of the plurality of regions.

In one embodiment, a wearable LASER scanner for detecting obstacles in an environment of a user in real-time is disclosed. In one example, the wearable LASER scanner includes a processor and a computer-readable medium communicatively coupled to the processor. The computer-readable medium store processor-executable instructions, which, on execution, cause the processor to generate a LASER beam towards each of a plurality of regions in the environment of the user. The environment includes an arc with respect to a current position of the user. The arc includes a predefined radial distance, a predefined angle, and one of a predefined height or a predefined depth. The arc is divided into the plurality of regions based on a corresponding angle and one of a corresponding height or a corresponding depth with respect to the current position of the user. The processor-executable instructions, on execution, further cause the processor to receive a feedback signal based on reflection of the LASER beam from an obstacle located in at least one of the plurality of regions. The processor-executable instructions, on execution, further cause the processor to transform the feedback signal from the at least one of the plurality of regions into obstacle information through an ML algorithm. The obstacle information includes an angle and one of a height or a depth of the obstacle with respect to the current position of the user. The processor-executable instructions, on execution, further cause the processor to activate, by a wearable device, one or more of a plurality of pressure elements of an obstacle matrix based on the obstacle information of the at least one of the plurality of regions. The plurality of pressure elements is arranged in rows and columns in the obstacle matrix. Each of the plurality of pressure elements corresponds to each of the plurality of regions. The processor-executable instructions, on execution, further cause the processor to generate, by the wearable device, a predefined pressure through each of the one or more of the plurality of pressure elements of the obstacle matrix based on the obstacle information of the at least one of the plurality of regions. The one or more of the plurality of pressure elements correspond to the at least one of the plurality of regions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
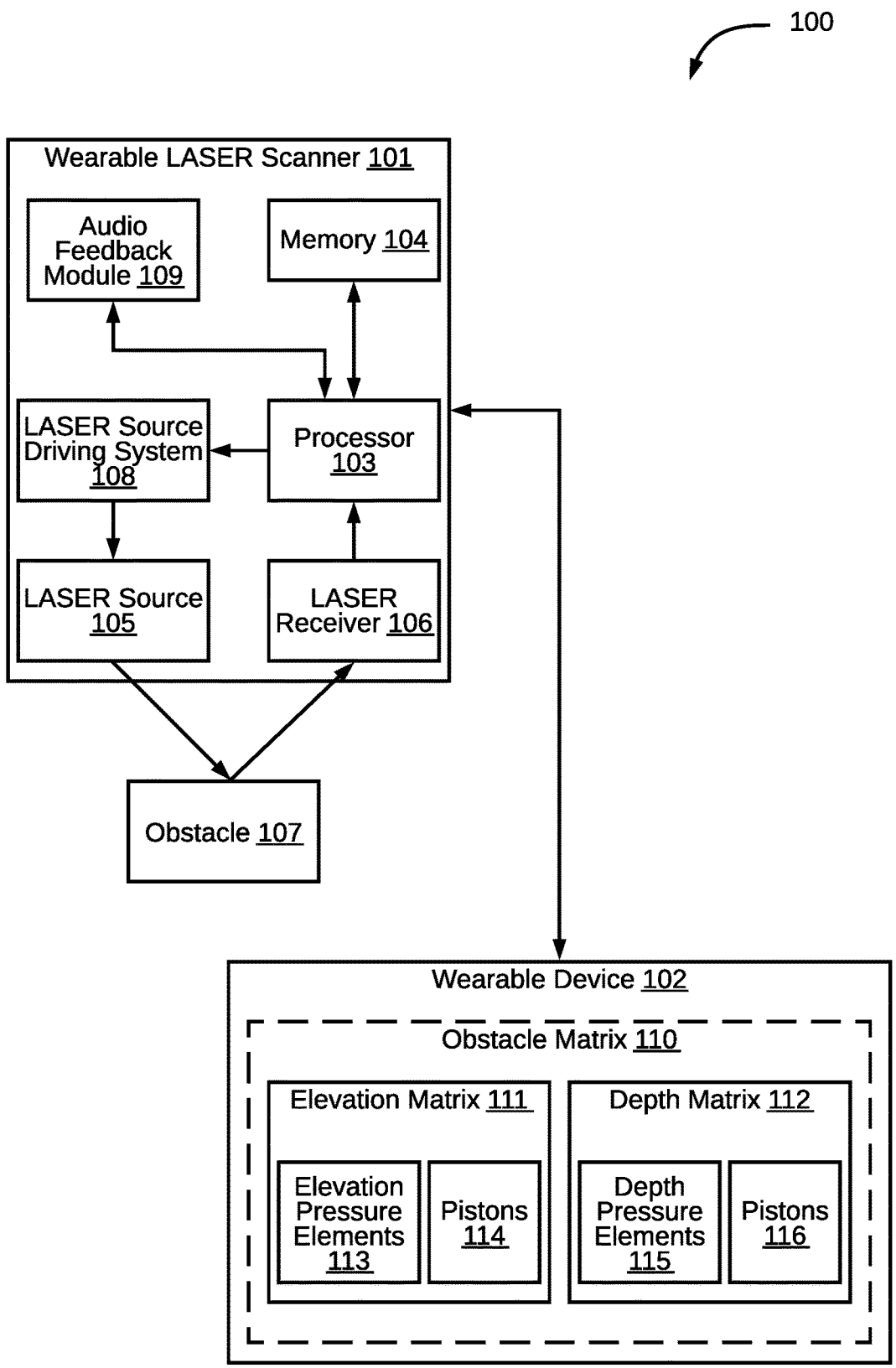
FIG. 1 is a block diagram of an exemplary system for detecting obstacles in an environment of a user in real-time, in accordance with some embodiments of the present disclosure.

Referring now to FIG. 1, an exemplary system 100 for detecting obstacles in an environment of a user in real-time is illustrated, in accordance with some embodiments of the present disclosure. The system 100 may implement a wearable Light Amplification by Stimulated Emission of Radiation (LASER) scanner 101 (for example, smart belt, smart jewelry (such as, necklace, choker, pendant, etc.), tablet, smartphone, mobile phone, or any other wearable computing device) and a wearable device 102 (for example, watch, glasses, belt, jewelry (such as, ring, wristband, bracelet, etc.), headband, or any other wearable device), in accordance with some embodiments of the present disclosure. The wearable LASER scanner 101 is communicatively coupled to the wearable device 102. The wearable LASER scanner 101 may detect obstacles in an environment of a user in real-time and provide obstacle information to the wearable device 102. Each of the wearable LASER scanner 101 and the wearable device 102 may be removably attached to the user.

As will be described in greater detail in conjunction with FIGS. 2-6, the wearable LASER scanner may generate a LASER beam towards each of a plurality of regions in the environment of the user. The environment includes an arc with respect to a current position of the user. The arc includes a predefined radial distance, a predefined angle, and one of a predefined height or a predefined depth. The arc is divided into the plurality of regions based on a corresponding angle and one of a corresponding height or a corresponding depth with respect to the current position of the user. The wearable LASER scanner may further receive a feedback signal based on reflection of the LASER beam from an obstacle located in at least one of the plurality of regions. The wearable LASER scanner may further transform the feedback signal from the at least one of the plurality of regions into obstacle information through an ML algorithm. The obstacle information includes an angle and one of a height or a depth of the obstacle with respect to the current position of the user. The wearable device may activate one or more of a plurality of pressure elements of an obstacle matrix based on the obstacle information of the at least one of the plurality of regions. The plurality of pressure elements is arranged in rows and columns in the obstacle matrix. Each of the plurality of pressure elements corresponds to each of the plurality of regions. The wearable device may further generate a predefined pressure through each of the one or more of the plurality of pressure elements of the obstacle matrix based on the obstacle information of the at least one of the plurality of regions. The one or more of the plurality of pressure elements correspond to the at least one of the plurality of regions.

In some embodiments, the wearable LASER scanner 101 includes one or more processors 103, and a computer-readable medium (for example, a memory 104). The memory 104 may include the ML algorithm. Further, the memory 104 may store instructions that, when executed by the one or more processors 103, cause the one or more processors 103 to detect obstacles in the environment of the user in real-time, in accordance with aspects of the present disclosure. The memory 104 may also store various data (for example, obstacle information, ML algorithm data, pressure elements activation data, and the like) that may be captured, processed, and/or required by the system 100.

Further, the wearable LASER scanner 101 may include a LASER source 105 and a LASER receiver 106. The LASER source 105 generates a LASER beam towards each of a plurality of regions in the environment of the user. The environment includes an arc with respect to a current position of the user. The arc includes a predefined radial distance, a predefined angle, and one of a predefined height or a predefined depth. By way of an example, the arc may be a semi-circle (180 degrees) around the user towards a moving direction of the user up to a radial distance of about 1 foot from the user. The arc is divided into the plurality of regions based on a corresponding angle and one of a corresponding height or a corresponding depth with respect to the current position of the user. Further, the LASER beam may hit an obstacle 107 located in at least one of the plurality of regions. The LASER beam is reflected from the obstacle 107 as a feedback signal. The LASER receiver 106 detects the feedback signal. Further, the LASER receiver 106 is configured to send the feedback signal to the one or more processors 103 and the memory 104.

Further, the wearable LASER scanner 101 includes a LASER source driving system 108. In some embodiments, the LASER source driving system 108 includes a servo mechanism including one or more servo motors (for example, a servo mechanism based on levers, a servo mechanism with gears directly coupled to a motor, or any other movement driving system (such as, an electromagnetic-driven system)). The LASER source driving system 108 changes angle of the LASER source 105 in steps such that the LASER beam is moved along each of the plurality of regions in real-time.

Further, the feedback signal is transformed into obstacle information through the ML algorithm. It may be noted that the obstacle information includes an angle and one of a height or a depth of the obstacle with respect to the current position of the user. The ML algorithm calculates a real distance of the obstacle in a region from the plurality of regions with respect to the user based on the feedback signal received at a minimum issued angle and a maximum issued angle of the LASER beam. Further, the ML algorithm calculates an ideal distance of the region with respect to the user through trigonometric operations based on the minimum issued angle and the maximum issued angle of the LASER beam. The ideal distance is a distance of the region from the user in absence of the obstacle. Further, the ML algorithm estimates one of the elevation or the depth of the obstacle based on a difference between the real distance and the ideal distance. In some embodiments, the wearable LASER scanner 101 may include an audio feedback module 109. The audio feedback module 109 notifies the user through an audio feedback about the obstacle information.

Based on the obstacle information, the wearable LASER scanner 101 may send an activating signal to one or more of a plurality of pressure elements of an obstacle matrix 110 of the wearable device 102. The plurality of pressure elements is arranged in rows and columns in the obstacle matrix 110. Each of the plurality of pressure elements of the obstacle matrix 110 corresponds to each of the plurality of regions. It may be noted that the obstacle matrix 110 includes an elevation matrix 11 and a depth matrix 112. The elevation matrix 111 includes a plurality of elevation pressure elements 113 and a plurality of pistons 114. Each of the plurality of elevation pressure elements 113 is operated by one or more of the plurality of pistons 114. The depth matrix 112 includes a plurality of depth pressure elements 115 and a plurality of pistons 116. Each of the plurality of depth pressure elements 115 is operated by one or more of the plurality of pistons 116. Each of the plurality of elevation pressure elements 113 corresponds to a region from the plurality of regions above ground level and each of the plurality of depth pressure elements 115 corresponds to a region from the plurality of regions below ground level.

Further, upon receiving the activating signal the wearable device 102 activates one or more of a plurality of pressure elements of the obstacle matrix 110 based on the obstacle information of the at least one of the plurality of regions. The wearable device 102 activates one or more of the plurality of elevation pressure elements 113 of the elevation matrix 111 based on the obstacle information of the at least one of the plurality of regions when each of the at least one of the plurality of regions is above the ground level. Additionally, the wearable device 102 activates one or more of the plurality of depth pressure elements 115 of the depth matrix 112 based on the obstacle information of the at least one of the plurality of regions when each of the at least one of the plurality of regions is below the ground level. It may be noted that number of the plurality of depth pressure elements 115 activated is directly proportional to depth level of the at least one of the plurality of regions.

Further, the wearable device 102 generates a predefined pressure through each of the one or more of the plurality of pressure elements of the obstacle matrix 110 based on the obstacle information of the at least one of the plurality of regions. The one or more of the plurality of pressure elements correspond to the at least one of the plurality of regions. The wearable device 102 generates a predefined pressure through each of one or more of the plurality of elevation pressure elements 113 of the elevation matrix 111 using the one or more associated pistons 114 based on the obstacle information of the at least one of the plurality of regions when each of the at least one of the plurality of regions is above the ground level. Additionally, the wearable device 102 generates a predefined pressure through each of one or more of the plurality of depth pressure elements 115 of the depth matrix 112 using the one or more associated pistons 116 based on the obstacle information of the at least one of the plurality of regions when each of the at least one of the plurality of regions is below the ground level. It should be noted that intensity of the predefined pressure is directly proportional to depth level of the at least one of the plurality of regions. Based on the pressure generated by the one or more of the plurality of pressure elements of the wearable device 102 (according to a pre-defined and user selectable coding), the user may be alerted in real-time about obstacles lying in the environment.

It should be noted that each of the wearable LASER scanner 101 and the wearable device 102 includes a power supply such as, a battery (not shown in figure). In some exemplary scenarios, pressure may not be generated due to low battery. In such scenarios, a low battery signal may be provided to warn the user that a lack of pressure may be wrongly interpreted as absence of obstacles. Additionally, a battery remaining time may be monitored and evaluated before engaging with a detected obstacle (such as, stairs) to avoid leaving the user stuck in an uncomfortable situation (for example, in middle of a flight of stairs).

It should be noted that all such aforementioned modules 103-116 may be represented as a single module or a combination of different modules. Further, as will be appreciated by those skilled in the art, each of the modules 103-116 may reside, in whole or in parts, on one device or multiple devices in communication with each other. In some embodiments, each of the modules 103-116 may be implemented as dedicated hardware circuit comprising custom application-specific integrated circuit (ASIC) or gate arrays, off-the-shelf semiconductors such as logic chips, transistors, or other discrete components. Each of the modules 103-116 may also be implemented in a programmable hardware device such as a field programmable gate array (FPGA), programmable array logic, programmable logic device, and so forth. Alternatively, each of the modules 103-116 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for detecting obstacles in an environment of a user in real-time. For example, the exemplary system 100 may detect obstacles in an environment of a user in real-time by the processes discussed herein. In particular, as will be appreciated by those of ordinary skill in the art, control logic and/or automated routines for performing the techniques and steps described herein may be implemented by the system 100 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 2A:
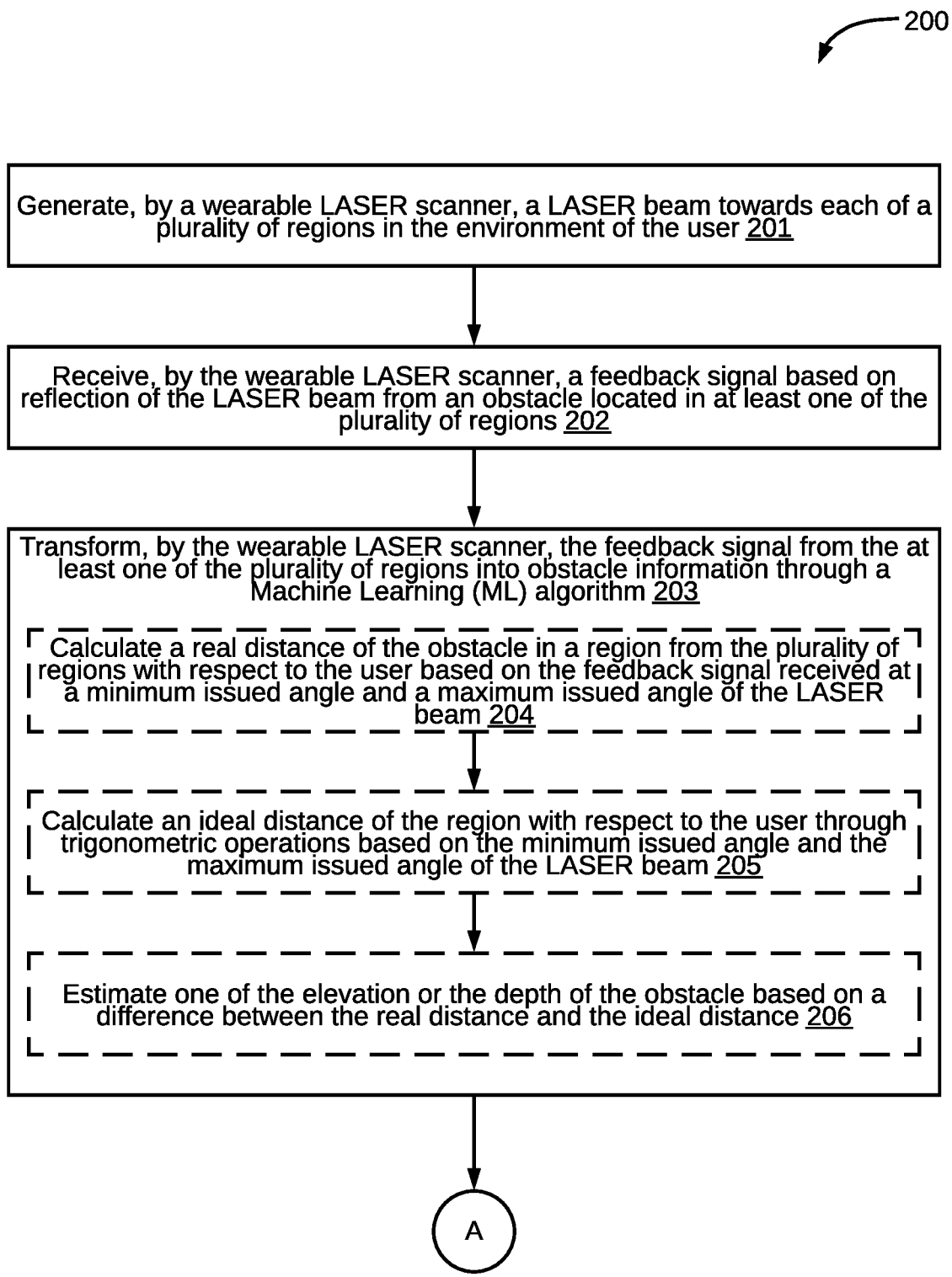
FIGS. 2A and 2B illustrate a flow diagram of an exemplary process for detecting obstacles in an environment of a user in real-time, in accordance with some embodiments of the present disclosure.
Figure 2B:
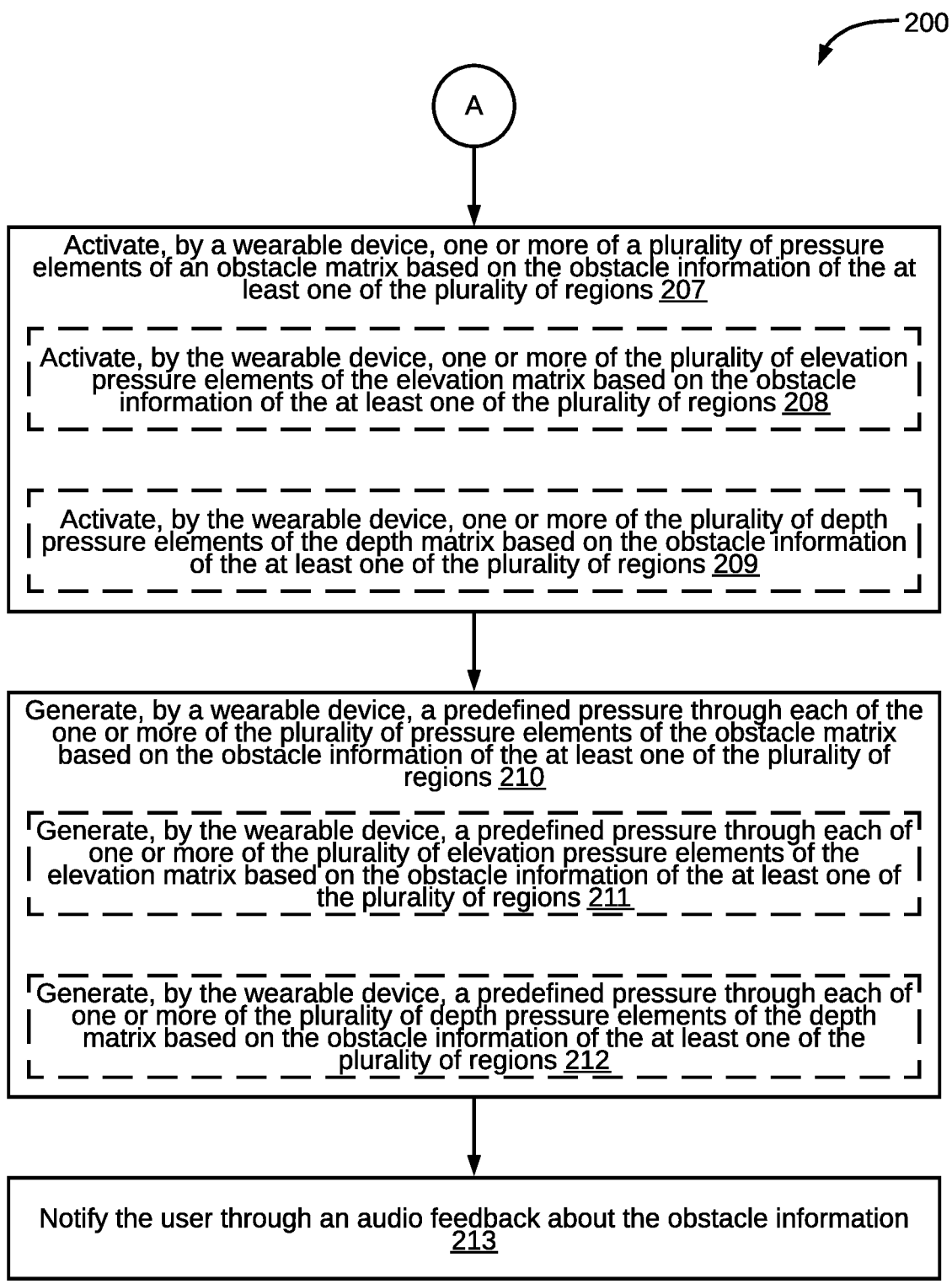

Referring now to FIGS. 2A and 2B, an exemplary process 200 for detecting obstacles in an environment of a user in real-time is depicted via a flowchart, in accordance with some embodiments of the present disclosure. In an embodiment, the process 200 is implemented by the system 100. The process 200 includes generating, by a wearable LASER scanner (for example, the wearable LASER scanner 101), a LASER beam towards each of a plurality of regions in the environment of the user, at step 201. The environment includes an arc with respect to a current position of the user. The arc includes a predefined radial distance, a predefined angle, and one of a predefined height or a predefined depth. The arc is divided into the plurality of regions based on a corresponding angle and one of a corresponding height or a corresponding depth with respect to the current position of the user. In some embodiments, the LASER beam is moved along each of the plurality of regions in real-time via a driving system (for example, the LASER source driving system 108). Further, the process 200 includes receiving, by the wearable LASER scanner, a feedback signal based on reflection of the LASER beam from an obstacle located in at least one of the plurality of regions, at step 202. In an embodiment, the wearable LASER scanner is configured to activate a standby mode when a movement of the user is not detected for a predefined threshold time.

Further, the process 200 includes transforming, by the wearable LASER scanner, the feedback signal from the at least one of the plurality of regions into obstacle information through an ML algorithm, at step 203. The obstacle information includes an angle and one of a height or a depth of the obstacle with respect to the current position of the user. Further, the step 203 of the process 200 includes calculating a real distance of the obstacle in a region from the plurality of regions with respect to the user based on the feedback signal received at a minimum issued angle and a maximum issued angle of the LASER beam, at step 204. Further, the step 203 of the process 200 includes calculating an ideal distance of the region with respect to the user through trigonometric operations based on the minimum issued angle and the maximum issued angle of the LASER beam, at step 205. The ideal distance is a distance of the region from the user in absence of the obstacle. Further, the step 203 of the process 200 includes estimating one of the elevation or the depth of the obstacle based on a difference between the real distance and the ideal distance, at step 206.

By way of an example, the LASER source 105 generates a LASER beam towards each of the plurality of regions in the environment. Upon contacting the obstacle 107, the LASER beam is reflected and is received by the LASER receiver 106. The LASER source 105 generates the LASER beam at varying angles in steps through the LASER source driving system 108. Further, the LASER receiver 106 provides the feedback signal to the processor 103. The processor-executable instructions stored in the memory 104 cause the processor 103 to transform the feedback signal into obstacle information using an ML algorithm. The obstacle information may include location of the obstacle in one or more regions.

Further, the process 200 includes activating, by a wearable device (for example, the wearable device 102), one or more of a plurality of pressure elements of an obstacle matrix based on the obstacle information of the at least one of the plurality of regions, at step 207. The plurality of pressure elements is arranged in rows and columns in the obstacle matrix. Each of the plurality of pressure elements corresponds to each of the plurality of regions. Each of the plurality of pressure elements is operated by one or more pistons. In an embodiment, the obstacle matrix (such as, the obstacle matrix 110) includes an elevation matrix (for example, the elevation matrix 111) and a depth matrix (for example, the depth matrix 112). The elevation matrix includes a plurality of elevation pressure elements and the depth matrix includes a plurality of depth pressure elements. Each of the plurality of elevation pressure elements corresponds to a region from the plurality of regions above ground level and each of the plurality of depth pressure elements corresponds to a region from the plurality of regions below ground level.

Further, the step 207 of the process 200 includes activating, by the wearable device, one or more of the plurality of elevation pressure elements of the elevation matrix based on the obstacle information of the at least one of the plurality of regions, at step 208. Each of the at least one of the plurality of regions is above the ground level. Further, the step 207 of the process 200 includes activating, by the wearable device, one or more of the plurality of depth pressure elements of the depth matrix based on the obstacle information of the at least one of the plurality of regions, at step 209. Each of the at least one of the plurality of regions is below the ground level. Number of the plurality of depth pressure elements activated is directly proportional to depth level of the at least one of the plurality of regions. It may be noted that the step 207 of the process 200 may include at least one of the step 208 and the step 209.

Further, the process 200 includes generating, by the wearable device, a predefined pressure through each of the one or more of the plurality of pressure elements of the obstacle matrix based on the obstacle information of the at least one of the plurality of regions, at step 210. The one or more of the plurality of pressure elements correspond to the at least one of the plurality of regions. Further, the step 210 of the process 200 includes generating, by the wearable device, a predefined pressure through each of one or more of the plurality of elevation pressure elements of the elevation matrix based on the obstacle information of the at least one of the plurality of regions, at step 211. Each of the at least one of the plurality of regions is above the ground level.

Further, the step 210 of the process 200 includes generating, by the wearable device, a predefined pressure through each of one or more of the plurality of depth pressure elements of the depth matrix based on the obstacle information of the at least one of the plurality of regions, at step 212. Each of the at least one of the plurality of regions is below the ground level. Intensity of the predefined pressure is directly proportional to depth level of the at least one of the plurality of regions. It may be noted that the step 210 of the process 200 may include at least one of the step 211 and the step 212. Further, the process 200 includes notifying the user through an audio feedback about the obstacle information, at step 213.

In continuation of the example above, the wearable LASER scanner 101 sends the obstacle information to the wearable device 102. The wearable device 102 activates one or more pressure elements of the elevation matrix 111 or the depth matrix 112 corresponding to a region based on the obstacle information. Further, the one or more pressure elements of the elevation matrix 111 or the depth matrix 112 generate a predefined pressure at a predefined intensity through the pistons 114 or the pistons 116, respectively, based on the obstacle information. In some embodiments, in addition to tactile feedback through the one or more pressure elements, the wearable LASER scanner 101 may provide the obstacle information to the user in form of an audio through the audio feedback module 109.

Figure 3:
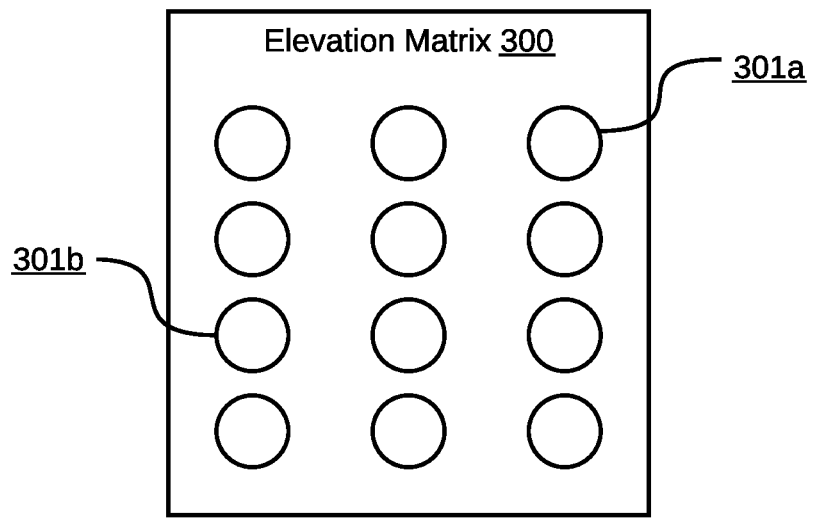
FIG. 3 illustrates an exemplary elevation matrix for detecting obstacles above ground level, in accordance with some embodiments of the present disclosure.

Referring now to FIG. 3, an exemplary elevation matrix 300 for detecting obstacles above ground level is illustrated, in accordance with some embodiments of the present disclosure. The elevation matrix 300 includes a plurality of elevation pressure elements (such as, an elevation pressure element 301a and an elevation pressure element 301b). The plurality of elevation pressure elements is arranged in rows and columns in the elevation matrix 300. By way of an example, the elevation matrix 300 is a 4×3 matrix (4 rows and 3 columns). Environment of a user scanned by a wearable LASER device is an arc of a predefined radial distance (for example, 1 foot) and a predefined angle (for example, 180 degrees) in moving direction of the user. The arc is divided into a plurality of regions based on angle and elevation with respect to the user. It may be noted that the angle and the elevation of the arc may be configured based on user-specific requirements (for example, customized height for children, people using wheelchair, etc.).

Each of the plurality of elevation pressure elements corresponds to a region from the plurality of regions above ground level. Location of an elevation pressure element on the elevation matrix 300 is directly related to location of the region in the environment of the user. In some embodiments, rows of the elevation matrix 300 correspond to elevation of a region above the ground level and columns of the elevation matrix 300 correspond to angle of the region with respect to the user. By way of an example, first row of the elevation matrix 300 may correspond to an elevation above the ground level in a range of shoulder-level height of the user up to head-level height of the user, second row of the elevation matrix 300 may correspond to an elevation above the ground level in a range of about 0.5 m to the shoulder-level height of the user, third row of the elevation matrix 300 may correspond to an elevation above the ground level in a range of about 0.25 m to about 0.5 m, and fourth row of the elevation matrix 300 may correspond to an elevation above the ground level up to about 0.25 m.

Further, by way of an example, assuming angle in the moving direction of the user to be 0 degrees and the arc ranging from 90 degrees towards left of the user to 90 degrees towards right of the user from the moving direction, first column of the elevation matrix 300 may correspond to an angle in a range of 90 degrees towards the left of the user to about 30 degrees towards the left of the user, second column of the elevation matrix 300 may correspond to an angle in a range of about 30 degrees towards the left of the user to about 30 degrees towards the right of the user, and third column of the elevation matrix 300 may correspond to an angle in a range of about 30 degrees towards the right of the user to about 90 degrees towards the right of the user.

Since, the elevation pressure element 301a is located on top right (first row, third column) of the elevation matrix 300, therefore, the elevation pressure element 301a corresponds to a region at an elevation above the ground level in a range of the shoulder-level height of the user up to the head-level height of the user and at an angle in a range of about 30 degrees towards the right of the user to about 90 degrees towards the right of the user. Similarly, since the elevation pressure element 301b is located on the third row and the first column of the elevation matrix 300, therefore, the elevation pressure element 301b corresponds to a region at an elevation above the ground level in a range of about 0.25 m to about 0.5 m and at an angle in a range of 90 degrees towards the left of the user to about 30 degrees towards the left of the user. Based on pressure generated by the one or more elevation pressure elements, the user may determine a region where the obstacle is located and may act accordingly to avoid colliding with the obstacle.

Referring now to FIGS. 4A-E, an exemplary depth matrix 400 for detecting obstacles below ground level is illustrated, in accordance with some embodiments of the present disclosure. The depth matrix 400 includes a plurality of depth pressure elements (such as, a depth pressure element 401a and a depth pressure element 401b). The plurality of depth pressure elements is arranged in rows and columns in the depth matrix 400. By way of an example, the depth matrix 400 is a 2×3 matrix (2 rows and 3 columns). Environment of a user scanned by a wearable LASER device is an arc of a predefined radial distance (for example, 1 foot) and a predefined angle (for example, 180 degrees) in moving direction of the user. The arc is divided into a plurality of regions based on angle and depth with respect to the user.

Each of the plurality of depth pressure elements corresponds to a region from the plurality of regions below the ground level. Number of the plurality of depth pressure elements activated in the depth matrix 400 and intensity of pressure generated by the plurality of depth pressure elements of the depth matrix are directly proportional to depth level of the region. In some embodiments, rows of the depth matrix 400 correspond to depth of a region below the ground level and columns of the depth matrix 400 correspond to angle of the region with respect to the user. By way of an example, first row of the depth matrix 400 may correspond to a depth in a range of about 30 cm below ground level up to the ground level, and second row of the depth matrix 400 may correspond to a depth greater than 30 cm. Pressure of varying intensities may indicate magnitude of the depth of the region and a type of obstacle. For example, a high intensity pressure in a depth pressure element in the first row of the depth matrix 400 may indicate an obstacle (such as, a step) with depth less than 30 cm and on the other hand, a low intensity pressure in a depth pressure element in the first row of the depth matrix 400 may indicate a liquid obstacle (such as, a water puddle or a seashore).

Further, by way of an example, assuming angle in the moving direction of the user to be 0 degrees and the arc ranging from 90 degrees towards left of the user to 90 degrees towards right of the user from the moving direction, first column of the depth matrix 400 may correspond to an angle in a range of 90 degrees towards the left of the user to about 30 degrees towards the left of the user, second column of the depth matrix 400 may correspond to an angle in a range of about 30 degrees towards the left of the user to about 30 degrees towards the right of the user, and third column of the depth matrix 400 may correspond to an angle in a range of about 30 degrees towards the right of the user to about 90 degrees towards the right of the user.

Figure 4A:
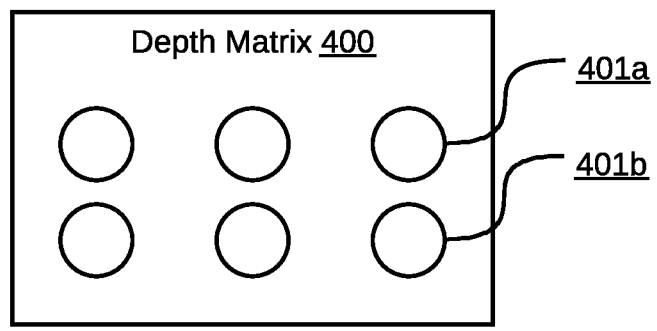
FIGS. 4A-E illustrate an exemplary depth matrix for detecting obstacles below ground level, in accordance with some embodiments of the present disclosure.
Figure 4B:
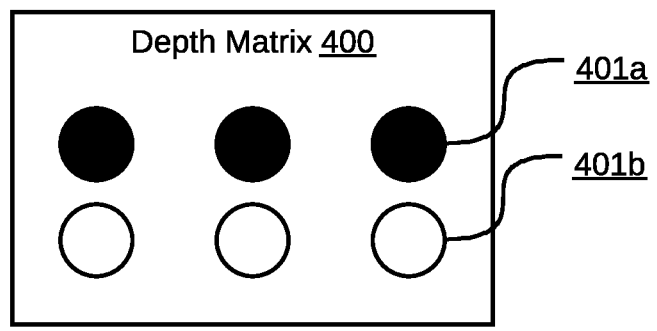
Figure 4C:
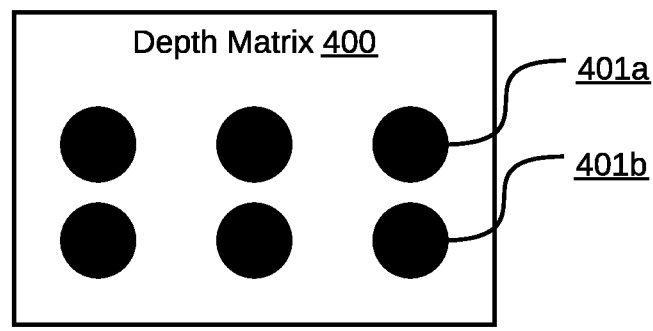

In FIG. 4A, each of the plurality of depth pressure elements of the depth matrix 400 does not generate pressure indicating absence of an obstacle in the environment of the user. In FIG. 4B, each of depth pressure elements of the first row of the depth matrix 400 generate high intensity pressure indicating presence of an obstacle with a depth in a range of about 30 cm below ground level up to the ground level in the environment of the user. Each of depth pressure elements of the second row of the depth matrix 400 do not generate pressure indicating that the obstacle is not deeper than 30 cm. In such a scenario, the obstacle may be a step. In FIG. 4C, each of the plurality of depth pressure elements of the depth matrix 400 generates pressure indicating presence of an obstacle (such as, a ravine or a cliff) with a depth greater than 30 cm in the environment of the user.

Figure 4D:
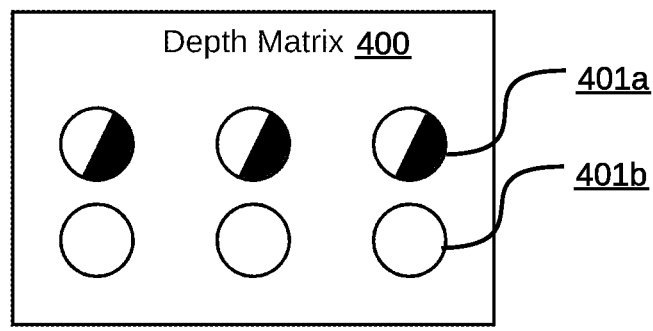
Figure 4E:
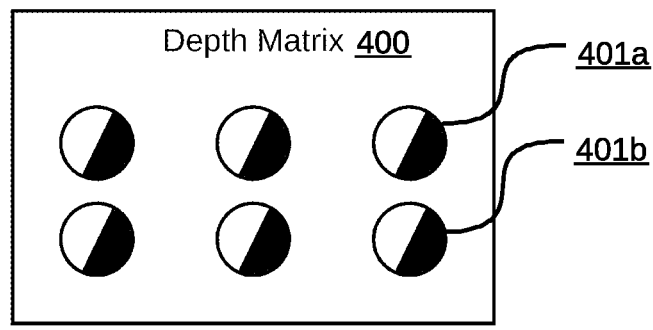

In FIG. 4D, each of depth pressure elements of the first row of the depth matrix 400 generate low intensity pressure indicating presence of a liquid obstacle with a depth in a range of about 30 cm below ground level up to the ground level in the environment of the user. Each of depth pressure elements of the second row of the depth matrix 400 do not generate pressure indicating that the obstacle is not deeper than 30 cm. In such a scenario, the obstacle may be a puddle or a seashore. In FIG. 4E, each of depth pressure elements of the first row of the depth matrix 400 generate low intensity pressure indicating presence of a liquid obstacle with a depth in a range of about 30 cm below ground level up to the ground level in the environment of the user. Each of depth pressure elements of the second row of the depth matrix 400 generate low intensity pressure indicating that the liquid obstacle is deeper than 30 cm. In such a scenario, the obstacle may be a water channel, a river, a pool, a pond, or the like. Based on pressure generated by the one or more depth pressure elements, the user may determine a region where the obstacle is located and may act accordingly to avoid colliding with the obstacle.

In another embodiment, the depth matrix 400 may be designed specifically for use in detecting steps of a stair. In such an embodiment, the depth pressure elements in the first row of the depth matrix 400 may generate pressure of varying intensities to indicate a height (or depth) of a step and the depth pressure elements in the second row of the depth matrix 400 may generate pressure of varying intensities to indicate an amplitude of the step. By way of an example, a high intensity pressure in a depth pressure element in the first row of the depth matrix 400 may indicate step with a high depth, a medium intensity pressure in a depth pressure element in the first row of the depth matrix 400 may indicate step with an intermediate depth, and a low intensity pressure in a depth pressure element in the first row of the depth matrix 400 may indicate step with a low depth. Further, by way of an example, a high intensity pressure in a depth pressure element in the second row of the depth matrix 400 may indicate step with a high amplitude (highly steep slope), a medium intensity pressure in a depth pressure element in the second row of the depth matrix 400 may indicate step with an intermediate amplitude (intermediate steepness), and a low intensity pressure in a depth pressure element in the second row of the depth matrix 400 may indicate step with a low amplitude (least steepness).

In some embodiments, the depth matrix 400 may be a 4×3 matrix (4 rows, 3 columns) providing a combination of depth pressure elements specific for obstacle depth and depth pressure elements specific for height of steps of a staircase. In some embodiments, the obstacle matrix may include the elevation matrix and the depth matrix in combination providing a complete coverage of the environment of the user in real-time.

Figure 5A:
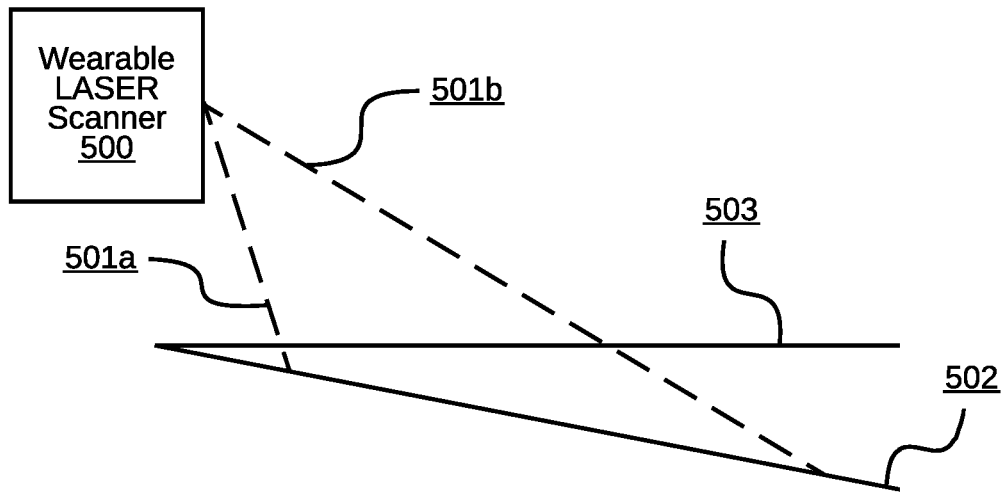
FIGS. 5A and 5B illustrate exemplary scenarios for detecting obstacles below ground level using a wearable Light Amplification by Stimulated Emission of Radiation (LASER) scanner, in accordance with some embodiments of the present disclosure.
Figure 5B:
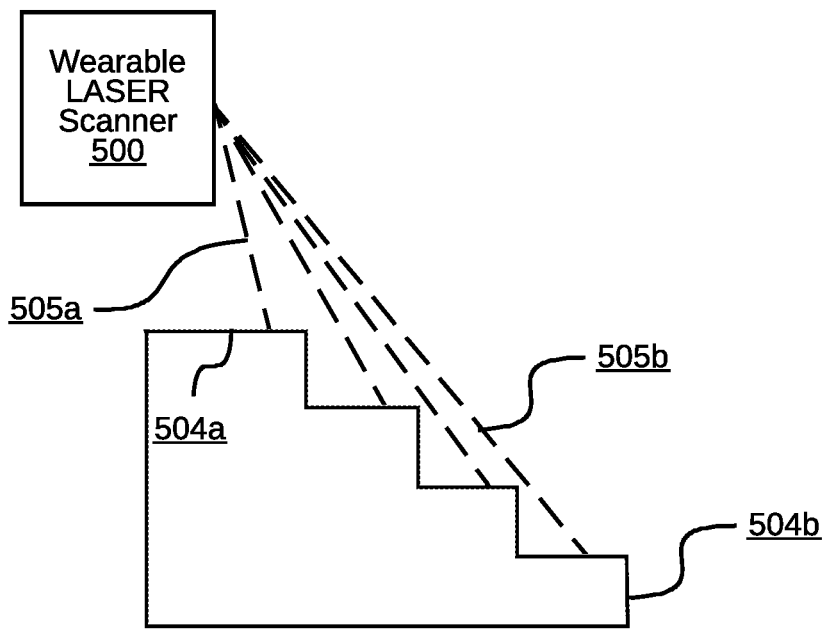

Referring now to FIGS. 5A and 5B, exemplary scenarios for detecting obstacles below ground level using a wearable Light Amplification by Stimulated Emission of Radiation (LASER) scanner 500 are illustrated, in accordance with some embodiments of the present disclosure. The wearable LASER scanner may be analogous to the wearable LASER scanner 101 of the system 100. In FIG. 5A, the wearable LASER scanner 500, worn by a user, generates a LASER beam 501*a* and a LASER beam 501*b* on a surface 502 via a LASER source (such as, the LASER source 105). It may be noted that the surface 502 is a downward slope relative to a flat reference surface 503. The wearable LASER scanner 500 includes a LASER source driving system (such as, the LASER source driving system 108). The LASER source driving system may include one or more servo motors for driving the LASER source along various angles to scan each of the plurality of regions stepwise in the environment of the user. By way of an example, angle associated with the LASER beam 501*a* is a minimum issued angle for the wearable LASER scanner 500 and angle associated with the LASER beam 501*b* is a maximum issued angle for the wearable LASER scanner 500. Each of the LASER beam 501*a* and the LASER beam 501*b* is reflected from the surface and is received by a LASER receiver (such as, the LASER receiver 106) as a feedback signal.

Real distance of the obstacle from the wearable LASER scanner 500 is determined based on time taken by each of the LASER beam 501*a* and the LASER beam 501*b* to travel from the wearable LASER scanner 500 to the surface 502 and back to the wearable LASER scanner 500 as the feedback signal. Further, the wearable LASER scanner 500 calculates an ideal distance of the region with respect to the user through trigonometric operations based on the minimum issued angle and the maximum issued angle of the LASER beam. The ideal distance is a distance of the region from the user in absence of the obstacle (for example, the flat reference surface 503). When the real distance of the obstacle is different from the ideal distance of the region, presence of an obstacle is estimated. Based on the strength of feedback signal received, the wearable LASER scanner 500 may activate one or more pressure elements corresponding to regions of the obstacle at a predefined pressure intensity.

In FIG. 5B, the wearable LASER scanner 500 is used to determine presence of stairs in the environment of the user. The stairs may include a step 504*a* and a step 504*b*. The wearable LASER scanner 500 generates a LASER beam 505*a* at a minimum issued angle and a LASER beam 505*b* at a maximum issued angle through the LASER source. It may be noted that the wearable LASER scanner 500 may evaluate number of steps ahead of the user, and height and amplitude of each of the steps. In some embodiments, angle of LASER beams may be reduced to obtain a more granular obstacle information. The obstacle information may be provided to the user via at least one of a tactile feedback and any different feedback methods (such as, audio feedback) in case of a possible danger (for example, too short steps, too high stair, or too thin stair space). It may be noted that scanning in one direction provides obstacle information with respect to the stairs and scanning in each of remaining 2 directions provides a different feedback. Based on the strength of feedback signal received, the wearable LASER scanner 500 may activate one or more pressure elements corresponding to regions of the obstacle at a predefined pressure intensity. For stairs, depth pressure elements in first row of a depth matrix may be activated at a pressure intensity varying from low to high depending upon height and amplitude of steps of the stairs. For a hill, depth pressure elements in each of first row and second row of the depth matrix may be activated at a high pressure intensity. Therefore, the user may be able to distinguish a staircase from a hill.

A vocal output may be produced to warn or inform the user of a road detected condition based on computation results. Further, tactile feedback may be coded properly and provided (for example, a smooth climb or a stairs grade evaluation), by using a system like a granular braille tactile reproduction). When dangerous obstacles (such as, a high wall or a deep hole) are detected during scanning, the feedback may be more intense and statutory and may be issued differently. Further, when dangerous obstacles are detected, each of audio feedback and tactile feedback with the obstacle information is immediate, not waiting for complete evaluation or calculation. For example, upon evaluation of data, the audio feedback may be "You have at least 5 stair steps going down in front of you. Within 5 feet walking distance, will inform you with more details when it starts going down as soon as we get closer."

In some embodiments, the wearable LASER scanner and the wearable device may be enriched and integrated with other systems based on image recognition techniques. Such embodiments may help in providing additional information such as "There is a wall on the left", or "There is a handrail on the right".

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
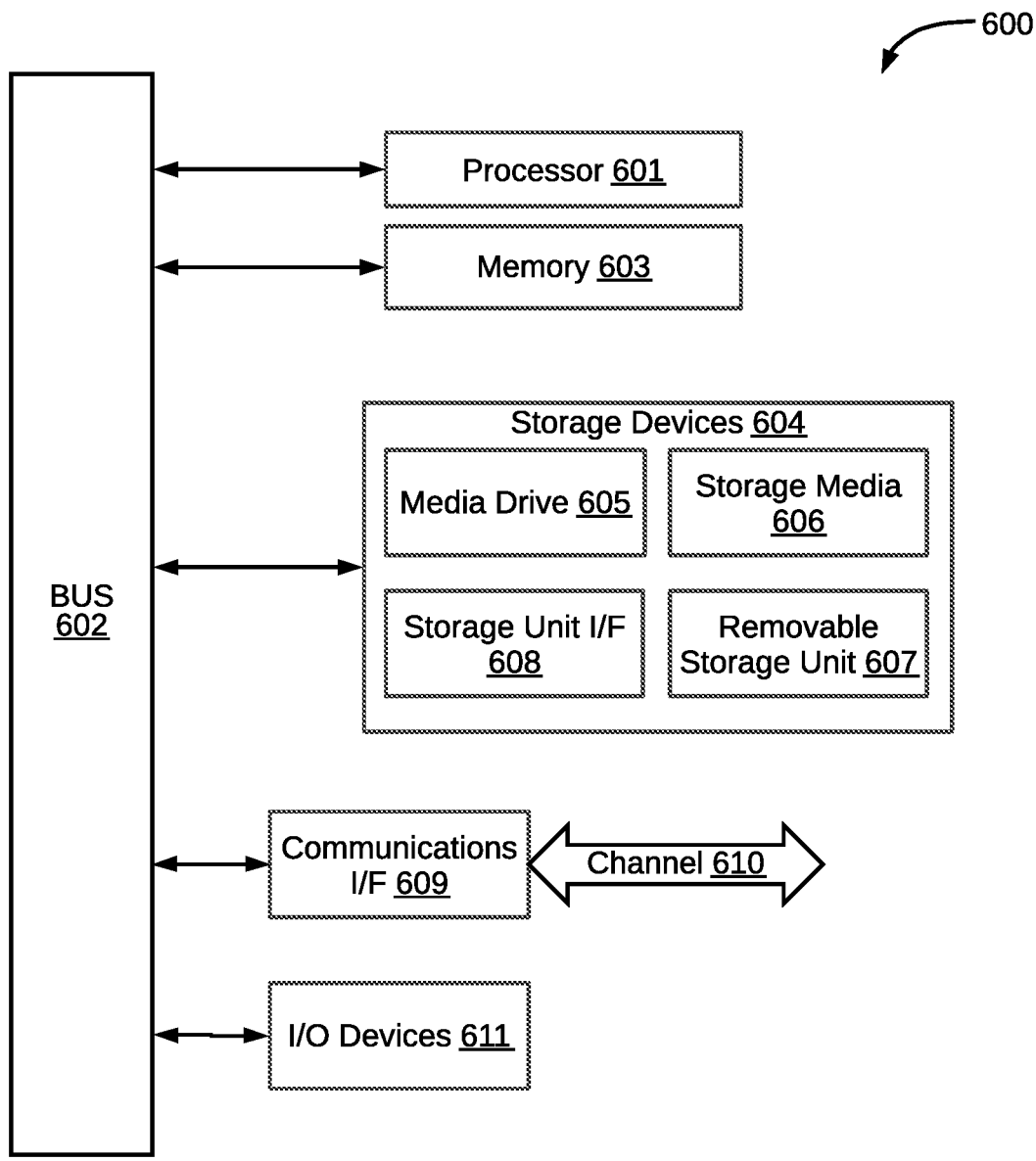
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, an exemplary computing system 600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment. The computing system 600 may include one or more processors, such as a processor 601 that may be implemented using a general or special purpose processing engine such as, for example, a microprocessor, microcontroller or other control logic. In this example, the processor 601 is connected to a bus 602 or other communication medium. In some embodiments, the processor 601 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 603 (main memory), for example, Random Access Memory (RAM) or other dynamic memory, for storing information and instructions to be executed by the processor 601. The memory 603 also may be used for storing temporary variables or other intermediate information during execution of instructions to be executed by the processor 601. The computing system 600 may likewise include a read only memory ("ROM") or other static storage device coupled to bus 602 for storing static information and instructions for the processor 601.

The computing system 600 may also include a storage device 604, which may include, for example, a media drives 605 and a removable storage interface. The media drive 605 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 606 may include, for example, a hard disk, magnetic tape, flash drive, or other fixed or removable medium that is read by and written to by the media drive 605. As these examples illustrate, the storage media 606 may include a computer-readable storage medium having stored there in particular computer software or data.

In alternative embodiments, the storage devices 604 may include other similar instrumentalities for allowing computer programs or other instructions or data to be loaded into the computing system 600. Such instrumentalities may include, for example, a removable storage unit 607 and a storage unit interface 608, such as a program cartridge and cartridge interface, a removable memory (for example, a flash memory or other removable memory module) and memory slot, and other removable storage units and interfaces that allow software and data to be transferred from the removable storage unit 607 to the computing system 600.

The computing system 600 may also include a communications interface 609. The communications interface 609 may be used to allow software and data to be transferred between the computing system 600 and external devices. Examples of the communications interface 609 may include a network interface (such as an Ethernet or other NIC card), a communications port (such as for example, a USB port, a micro USB port), Near field Communication (NFC), etc. Software and data transferred via the communications interface 609 are in the form of signals which may be electronic, electromagnetic, optical, or other signals capable of being received by the communications interface 609. These signals are provided to the communications interface 609 via a channel 610. The channel 610 may carry signals and may be implemented using a wireless medium, wire or cable, fiber optics, or other communications medium. Some examples of the channel 610 may include a phone line, a cellular phone link, an RF link, a Bluetooth link, a network interface, a local or wide area network, and other communications channels.

The computing system 600 may further include Input/Output (I/O) devices 611. Examples may include, but are not limited to a display, keypad, microphone, audio speakers, vibrating motor, LED lights, etc. The I/O devices 611 may receive input from a user and also display an output of the computation performed by the processor 601. In this document, the terms "computer program product" and "computer-readable medium" may be used generally to refer to media such as, for example, the memory 603, the storage devices 604, the removable storage unit 607, or signal(s) on the channel 610. These and other forms of computer-readable media may be involved in providing one or more sequences of one or more instructions to the processor 601 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 607, the media drive 605 or the communications interface 609. The control logic (in this example, software instructions or computer program code), when executed by the processor 601, causes the processor 601 to perform the functions of the invention as described herein.

Thus, the disclosed method and system try to overcome the technical problem of detecting obstacles in an environment of a user in real-time. The method and system provide allow visually impaired users to detect obstacles while keeping hands of the users free since pressure signals are applied to forearms of the users. Further, the method and system help in detecting obstacles in the environment of the user both above and below ground level. Further, the method and system significantly reduce expenses required to maintain a guide dog or a human assistant by the visually impaired users. Further, the method and system may be used by people that cannot access a guide dog due to allergies. Further, the method and system provide an additional safety means on top of other available means. Further, the method and system are user-customizable in terms of sensitivity of detection and height and depth monitoring by wearable LASER scanner.

As will be appreciated by those skilled in the art, the techniques described in the various embodiments discussed above are not routine, or conventional, or well understood in the art. The techniques discussed above provide for detecting obstacles in an environment of a user in real-time. The techniques first generate, by a wearable LASER scanner, a LASER beam towards each of a plurality of regions in the environment of the user. The environment includes an arc with respect to a current position of the user. The arc includes a predefined radial distance, a predefined angle, and one of a predefined height or a predefined depth. The arc is divided into the plurality of regions based on a corresponding angle and one of a corresponding height or a corresponding depth with respect to the current position of the user. The techniques then receive, by the wearable LASER scanner, a feedback signal based on reflection of the LASER beam from an obstacle located in at least one of the plurality of regions. The techniques then transform, by the wearable LASER scanner, the feedback signal from the at least one of the plurality of regions into obstacle information through an ML algorithm. The obstacle information includes an angle and one of a height or a depth of the obstacle with respect to the current position of the user. The techniques then activate, by a wearable device, one or more of a plurality of pressure elements of an obstacle matrix based on the obstacle information of the at least one of the plurality of regions. The plurality of pressure elements is arranged in rows and columns in the obstacle matrix. Each of the plurality of pressure elements corresponds to each of the plurality of regions. The techniques then generate, by the wearable device, a predefined pressure through each of the one or more of the plurality of pressure elements of the obstacle matrix based on the obstacle information of the at least one of the plurality of regions. The one or more of the plurality of pressure elements correspond to the at least one of the plurality of regions.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for detecting obstacles in an environment of a user in real-time. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for detecting obstacles in an environment of a user in real-time, the method comprising:

generating, by a wearable Light Amplification by Stimulated Emission of Radiation (LASER) scanner, a LASER beam towards each of a plurality of regions in the environment of the user, wherein the environment comprises an arc with respect to a current position of the user, wherein the arc comprises a predefined radial distance, a predefined angle, and one of a predefined height or a predefined depth, and wherein the arc is divided into the plurality of regions based on a corresponding angle and one of a corresponding height or a corresponding depth with respect to the current position of the user;

receiving, by the wearable LASER scanner, a feedback signal based on reflection of the LASER beam from an obstacle located in at least one of the plurality of regions;

transforming, by the wearable LASER scanner, the feedback signal from the at least one of the plurality of regions into obstacle information through a Machine Learning (ML) algorithm, wherein the obstacle information comprises an angle and one of a height or a depth of the obstacle with respect to the current position of the user;

activating, by a wearable device, one or more of a plurality of pressure elements of an obstacle matrix based on the obstacle information of the at least one of the plurality of regions, wherein the plurality of pressure elements is arranged in rows and columns in the obstacle matrix, and wherein each of the plurality of pressure elements corresponds to each of the plurality of regions; and generating, by the wearable device, a predefined pressure through each of the one or more of the plurality of pressure elements of the obstacle matrix based on the obstacle information of the at least one of the plurality of regions, wherein the one or more of the plurality of pressure elements correspond to the at least one of the plurality of regions.

2. The method of claim 1, wherein the obstacle matrix comprises an elevation matrix and a depth matrix, wherein the elevation matrix comprises a plurality of elevation pressure elements and the depth matrix comprises a plurality of depth pressure elements, and wherein each of the plurality of elevation pressure elements corresponds to a region from the plurality of regions above ground level and each of the plurality of depth pressure elements corresponds to a region from the plurality of regions below ground level.

3. The method of claim 2, wherein activating one or more of a plurality of pressure elements of an obstacle matrix further comprises, at least one of:

activating, by the wearable device, one or more of the plurality of elevation pressure elements of the elevation matrix based on the obstacle information of the at least one of the plurality of regions, wherein each of the at least one of the plurality of regions is above the ground level; and activating, by the wearable device, one or more of the plurality of depth pressure elements of the depth matrix based on the obstacle information of the at least one of the plurality of regions, wherein each of the at least one of the plurality of regions is below the ground level, and wherein number of the plurality of depth pressure elements activated is directly proportional to depth level of the at least one of the plurality of regions.

4. The method of claim 3, wherein generating a predefined pressure through each of the one or more of the plurality of pressure elements further comprises, at least one of:

generating, by the wearable device, a predefined pressure through each of one or more of the plurality of elevation pressure elements of the elevation matrix based on the obstacle information of the at least one of the plurality of regions, wherein each of the at least one of the plurality of regions is above the ground level; and generating, by the wearable device, a predefined pressure through each of one or more of the plurality of depth pressure elements of the depth matrix based on the obstacle information of the at least one of the plurality of regions, wherein each of the at least one of the plurality of regions is below the ground level, and wherein intensity of the predefined pressure is directly proportional to depth level of the at least one of the plurality of regions.

5. The method of claim 1, wherein transforming the feedback signal into obstacle information through the ML algorithm further comprises:

calculating a real distance of the obstacle in a region from the plurality of regions with respect to the user based on the feedback signal received at a minimum issued angle and a maximum issued angle of the LASER beam;

calculating an ideal distance of the region with respect to the user through trigonometric operations based on the minimum issued angle and the maximum issued angle of the LASER beam, wherein the ideal distance is a distance of the region from the user in absence of the obstacle; and estimating one of the elevation or the depth of the obstacle based on a difference between the real distance and the ideal distance.

6. The method of claim 1, wherein each of the plurality of pressure elements is operated by one or more pistons, and wherein the LASER beam is moved along each of the plurality of regions in real-time via a driving system.

7. The method of claim 1, further comprising notifying the user through an audio feedback about the obstacle information.

8. The method of claim 1, further comprising activating a standby mode when a movement of the user is not detected for a predefined threshold time.

9. A system for detecting obstacles in an environment of a user in real-time, the system comprising:

a wearable Light Amplification by Stimulated Emission of Radiation (LASER) scanner configured to:

generate a LASER beam towards each of a plurality of regions in the environment of the user, wherein the environment comprises an arc with respect to a current position of the user, wherein the arc comprises a predefined radial distance, a predefined angle, and one of a predefined height or a predefined depth, and wherein the arc is divided into the plurality of regions based on a corresponding angle and one of a corresponding height or a corresponding depth with respect to the current position of the user;

receive a feedback signal based on reflection of the LASER beam from an obstacle located in at least one of the plurality of regions; and transform the feedback signal from the at least one of the plurality of regions into obstacle information through a Machine Learning (ML) algorithm, wherein the obstacle information comprises an angle and one of a height or a depth of the obstacle with respect to the current position of the user; and a wearable device comprising an obstacle matrix and configured to:
activate one or more of a plurality of pressure elements of the obstacle matrix based on the obstacle information of the at least one of the plurality of regions, wherein the plurality of pressure elements is arranged in rows and columns in the obstacle matrix, and wherein each of the plurality of pressure elements corresponds to each of the plurality of regions; and
generate a predefined pressure through each of the one or more of the plurality of pressure elements of the obstacle matrix based on the obstacle information of the at least one of the plurality of regions, wherein the one or more of the plurality of pressure elements correspond to the at least one of the plurality of regions.

10. The system of claim 9, wherein the obstacle matrix comprises an elevation matrix and a depth matrix, wherein the elevation matrix comprises a plurality of elevation pressure elements and the depth matrix comprises a plurality of depth pressure elements, and wherein each of the plurality of elevation pressure elements corresponds to a region from the plurality of regions above ground level and each of the plurality of depth pressure elements corresponds to a region from the plurality of regions below ground level.

11. The system of claim 10, wherein to activate one or more of a plurality of pressure elements of an obstacle matrix, the wearable device is further configured to, at least one of:
activate, by the wearable device, one or more of the plurality of elevation pressure elements of the elevation matrix based on the obstacle information of the at least one of the plurality of regions, wherein each of the at least one of the plurality of regions is above the ground level; and
activate, by the wearable device, one or more of the plurality of depth pressure elements of the depth matrix based on the obstacle information of the at least one of the plurality of regions, wherein each of the at least one of the plurality of regions is below the ground level, and wherein number of the plurality of depth pressure elements activated is directly proportional to depth level of the at least one of the plurality of regions.

12. The system of claim 11, wherein to generate a predefined pressure through each of the one or more of the plurality of pressure elements, the wearable device is further configured to, at least one of:
generate, by the wearable device, a predefined pressure through each of one or more of the plurality of elevation pressure elements of the elevation matrix based on the obstacle information of the at least one of the plurality of regions, wherein each of the at least one of the plurality of regions is above the ground level; and
generate, by the wearable device, a predefined pressure through each of one or more of the plurality of depth pressure elements of the depth matrix based on the obstacle information of the at least one of the plurality of regions, wherein each of the at least one of the plurality of regions is below the ground level, and wherein intensity of the predefined pressure is directly proportional to depth level of the at least one of the plurality of regions.

13. The system of claim 9, wherein to transform the feedback signal into obstacle information through the ML algorithm, the wearable LASER scanner is further configured to:
calculate a real distance of the obstacle in a region from the plurality of regions with respect to the user based on the feedback signal received at a minimum issued angle and a maximum issued angle of the LASER beam;
calculate an ideal distance of the region with respect to the user through trigonometric operations based on the minimum issued angle and the maximum issued angle of the LASER beam, wherein the ideal distance is a distance of the region from the user in absence of the obstacle; and
estimate one of the elevation or the depth of the obstacle based on a difference between the real distance and the ideal distance.

14. The system of claim 9, wherein each of the plurality of pressure elements is operated by one or more pistons, and wherein the LASER beam is moved along each of the plurality of regions in real-time via a driving system.

15. The system of claim 9, wherein the wearable LASER scanner is further configured to notify the user through an audio feedback about the obstacle information.

16. The system of claim 9, wherein the wearable LASER scanner is further configured to activate a standby mode when a movement of the user is not detected for a predefined threshold time.

17. A wearable Light Amplification by Stimulated Emission of Radiation (LASER) scanner for detecting obstacles in an environment of a user in real-time, the wearable LASER scanner comprising:
a processor; and
a memory communicatively coupled to the processor, wherein the memory stores processor instructions, which when executed by the processor, cause the processor to:
generate a LASER beam towards each of a plurality of regions in the environment of the user, wherein the environment comprises an arc with respect to a current position of the user, wherein the arc comprises a predefined radial distance, a predefined angle, and one of a predefined height or a predefined depth, and wherein the arc is divided into the plurality of regions based on a corresponding angle and one of a corresponding height or a corresponding depth with respect to the current position of the user;
receive a feedback signal based on reflection of the LASER beam from an obstacle located in at least one of the plurality of regions;
transform the feedback signal from the at least one of the plurality of regions into obstacle information through a Machine Learning (ML) algorithm, wherein the obstacle information comprises an angle and one of a height or a depth of the obstacle with respect to the current position of the user;
activate, by a wearable device, one or more of a plurality of pressure elements of an obstacle matrix based on the obstacle information of the at least one of the plurality of regions, wherein the plurality of pressure elements is arranged in rows and columns in the obstacle matrix, and wherein each of the plurality of pressure elements corresponds to each of the plurality of regions; and
generate, by the wearable device, a predefined pressure through each of the one or more of the plurality of pressure elements of the obstacle matrix based on the obstacle information of the at least one of the plurality of regions, wherein the one or more of the plurality of pressure elements correspond to the at least one of the plurality of regions.

18. The wearable LASER scanner of claim 17, wherein to transform the feedback signal into obstacle information through the ML algorithm, the processor instructions, on execution, further cause the processor to:
- calculating a real distance of the obstacle in a region from the plurality of regions with respect to the user based on the feedback signal received at a minimum issued angle and a maximum issued angle of the LASER beam;
- calculating an ideal distance of the region with respect to the user through trigonometric operations based on the minimum issued angle and the maximum issued angle of the LASER beam, wherein the ideal distance is a distance of the region from the user in absence of the obstacle; and
- estimating one of the elevation or the depth of the obstacle based on a difference between the real distance and the ideal distance.

19. The wearable LASER scanner of claim 17, wherein the processor instructions, on execution, further cause the processor to notify the user through an audio feedback about the obstacle information.

20. The wearable LASER scanner of claim 17, wherein the processor instructions, on execution, further cause the processor to activate a standby mode when a movement of the user is not detected for a predefined threshold time.

* * * * *